United States Patent
Yang et al.

(10) Patent No.: US 8,711,534 B2
(45) Date of Patent: Apr. 29, 2014

(54) BATTERY POWER MANAGEMENT SYSTEM AND METHOD

(75) Inventors: Sei-Ching Yang, Hsinchu County (TW); Yu-Te Chou, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 23 days.

(21) Appl. No.: 13/543,886

(22) Filed: Jul. 9, 2012

(65) Prior Publication Data

US 2013/0038972 A1  Feb. 14, 2013

(30) Foreign Application Priority Data

Aug. 10, 2011  (TW) .............................. 100128786 A

(51) Int. Cl.
*H02H 3/20* (2006.01)
*H02H 3/24* (2006.01)
*H02H 9/04* (2006.01)
*H02J 7/00* (2006.01)

(52) U.S. Cl.
USPC .............................. 361/90; 361/91.1; 320/116

(58) Field of Classification Search
USPC ............................................ 320/116; 361/90
See application file for complete search history.

(56) References Cited

U.S. PATENT DOCUMENTS

| | | | |
|---|---|---|---|
| 5,640,626 A | 6/1997 | Makiyama et al. | |
| 6,104,164 A | 8/2000 | Iino et al. | |
| 7,675,269 B2 | 3/2010 | Huang | |
| 2006/0091854 A1* | 5/2006 | Chen et al. | 320/116 |

* cited by examiner

*Primary Examiner* — Dharti Patel
(74) *Attorney, Agent, or Firm* — Jianq Chyun IP Office

(57) ABSTRACT

A battery power management system including a protection switch, a battery set, a high-voltage protection chip, a plurality of voltage-dividing units and a low-voltage measurement chip is provided. The protection switch and the battery set are connected in series between a first power terminal and a second power terminal of the battery power management system. The battery set includes a plurality of battery cells and has a plurality of sensing nodes. The high-voltage protection chip controls the protection switch according to a plurality of first sensing voltages from the sensing nodes. The voltage-dividing units are connected to a part of the sensing nodes and divide a part of the first sensing voltages to generate a plurality of second sensing voltages. The low-voltage measurement chip is connected to the voltage-dividing units and measures electric quantities of the battery cells according to the second sensing voltages.

8 Claims, 4 Drawing Sheets

BATTERY POWER MANAGEMENT SYSTEM AND METHOD

CROSS-REFERENCE TO RELATED APPLICATION

This application claims the priority benefit of Taiwan application serial no. 100128786, filed on Aug. 10, 2011. The entirety of the above-mentioned patent application is hereby incorporated by reference herein and made a part of this specification.

BACKGROUND OF THE INVENTION

1. Field of the Invention

The invention relates to a battery power management. Particularly, the invention relates to a battery power management system and method.

2. Description of Related Art

To facilitate user's carry and usage, a portable electronic device (for example, a notebook computer) is generally assembled with a battery set. In this way, an operating power of the portable electronic device can be provided by an external power adapter or the assembled battery set.

FIG. 1 is a block schematic diagram of an existing battery power management system. Referring to FIG. 1, the battery power management system 100 includes a battery set 110, a battery measurement chip 120, a battery protection chip 130, resistors R11-R12 and a capacitor C1. The battery power management system 100 is connected to the external power adapter (not shown) through power terminals TM11 and TM12. The battery measurement chip 120 measures an electric quantity of the battery set 110 through a node between the resistor R11 and the capacitor C1, and provides a primary protection mechanism for the battery set 110. The battery protection chip 130 is used for providing a secondary protection mechanism for the battery set 110. In this way, the battery power management system 100 can both measure the electric quantity and maintain security of the battery set 110.

Since the battery measurement chip 120 is configured at a front end of the system, a high voltage transmitted by the power terminal TM11 is first transmitted to the battery measurement chip 120, and then the high voltage transmitted by the power terminal TM11 drops on the battery set 110 and the resistor R12 to form a low voltage for transmitting to the battery protection chip 130. When the system goes abnormal (for example, over voltage, over current, etc.), the battery measurement chip 120 is first damaged, and the battery power management system 100 cannot normally operate.

In an actual application, the battery set 110 can be a single-cell or a multi-cell battery, where each battery includes a plurality of battery cells. If the battery measurement chip 120 is implemented by using a low-voltage process technology, it cannot be used in a high-voltage application of the multi-cell battery system. Moreover, if the battery measurement chip 120 is implemented by a high-voltage process technology, a layout area of the battery power management system 100 and mass production cost thereof are increased.

SUMMARY OF THE INVENTION

The invention is directed to a battery power management system, in which a high-voltage protection chip is used to control a protection switch, and a low-voltage measurement chip is used to measure an electric quantity of a battery set. In this way, the low-voltage measurement chip can be applied to both of a single-cell battery system or a multi-cell battery system, by which product flexibility is enhanced, and development cost and mass production cost are reduced.

The invention is directed to a battery power management system, which has a low-voltage measurement chip, and the low-voltage measurement chip can be applied to both of a single-cell battery system or a multi-cell battery system, by which development cost and mass production cost of the system are reduced.

The invention is directed to a battery power management method, by which a plurality of first sensing voltages are used to control a protection switch, and an electric quantity of a battery set is measured according to a plurality of second sensing voltages produced by voltage-dividing the first sensing voltages. In this way, a battery cell in the battery set can be a single-cell or multi-cell, so as to reduce development cost and mass production cost of the system.

The invention provides a battery power management system having a first power terminal and a second power terminal, and includes a battery set, a high-voltage protection chip, a plurality of voltage-dividing units and a low-voltage measurement chip. The battery set includes a plurality of battery cells, and the battery cells are connected in series between the first power terminal and the second power terminal, and the battery set has a plurality of sensing nodes. The high-voltage protection chip connects the sensing nodes and the first power terminal, and provides a protection mechanism according to a plurality of first sensing voltages from the sensing nodes. The voltage-dividing units are connected to at least a part of the sensing nodes and provide a plurality of voltage-divided second sensing voltages. The low-voltage measurement chip is connected to the voltage-dividing units and measures electric quantities of the battery cells according to the second sensing voltages.

In an embodiment of the invention, the high-voltage protection chip detects characteristic parameters of the battery cells according to the first sensing voltages, and when the characteristic parameters of the battery cells exceed a first normal value, the high-voltage protection chip does not turn on a protection switch to cut off a loop of the battery cells.

In an embodiment of the invention, the low-voltage measurement chip includes a protection unit. The protection unit detects the characteristic parameters of the battery cells according to the second sensing voltages, and when the characteristic parameters of the battery cells exceed a second normal value, the protection unit cuts off the loop of the battery cells.

In an embodiment of the invention, the high-voltage protection chip includes a pre-charge switch. The pre-charge switch has a first terminal, a second terminal and a control terminal. The first terminal and the second terminal of the pre-charge switch are connected in parallel to a first terminal and a second terminal of the protection switch, and the high-voltage protection chip controls the pre-charge switch according to the first sensing voltages or a pre-charge signal.

The invention provides a battery power management system having a first power terminal, and the battery power management system includes a battery set, a protection switch, a high-voltage protection chip, a plurality of voltage-dividing units and a low-voltage measurement chip. The battery set includes a plurality of battery cells and has a plurality of sensing nodes. A part of the sensing nodes are respectively located between the battery cells, and the sensing nodes provide a plurality of first sensing voltages. The protection switch is connected between the first power terminal and the battery set. The high-voltage protection chip is connected to the sensing nodes and the protection switch, and controls the protection switch according to the first sensing voltages. The voltage-dividing units are respectively connected to the sensing nodes and divide the first sensing voltages to generate a plurality of second sensing voltages. The low-voltage measurement chip is connected to the voltage-dividing units and measures an electric quantity of the battery set according to the second sensing voltages.

According to another aspect, the invention provides a battery power management method, which is adapted to a battery set, where the battery set includes a plurality of battery cells and has a plurality of sensing nodes, and a part of the sensing nodes are respectively located between the battery cells. The battery power management method includes following steps. A plurality of first sensing voltages is provided through the sensing nodes. A protection switch is connected between a first power terminal and the battery set. The protection switch is controlled according to the first sensing voltages. The first sensing voltages are divided to generate a plurality of second sensing voltages. An electric quantity of the battery set is measured according to the second sensing voltages.

According to the above descriptions, the high-voltage protection chip is disposed at a front end of the system, and the high-voltage protection chip is used to control the protection switch. In this way, when the high-voltage protection chip is damaged due to abnormity, the battery power management system can still normally operate, so that reliability and service life of the system are improved. Besides, the high-voltage protection chip and the low-voltage measurement chip respectively obtain voltages related to the battery cells through a multi-input structure, so as to accurately determine the electric quantity of the battery set and protect the battery set.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
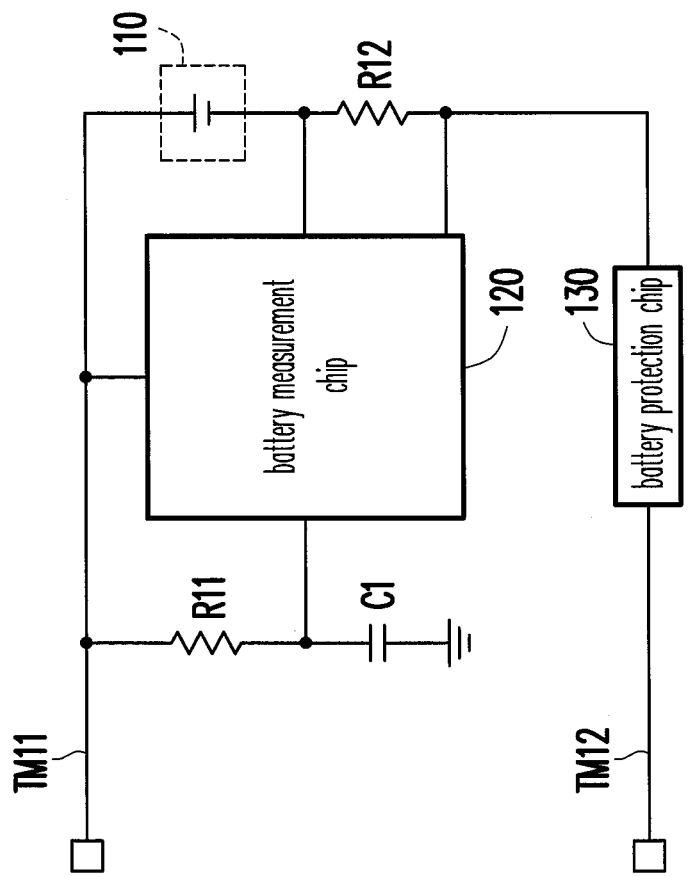
FIG. 1 is a block schematic diagram of an existing battery power management system.
Figure 2:
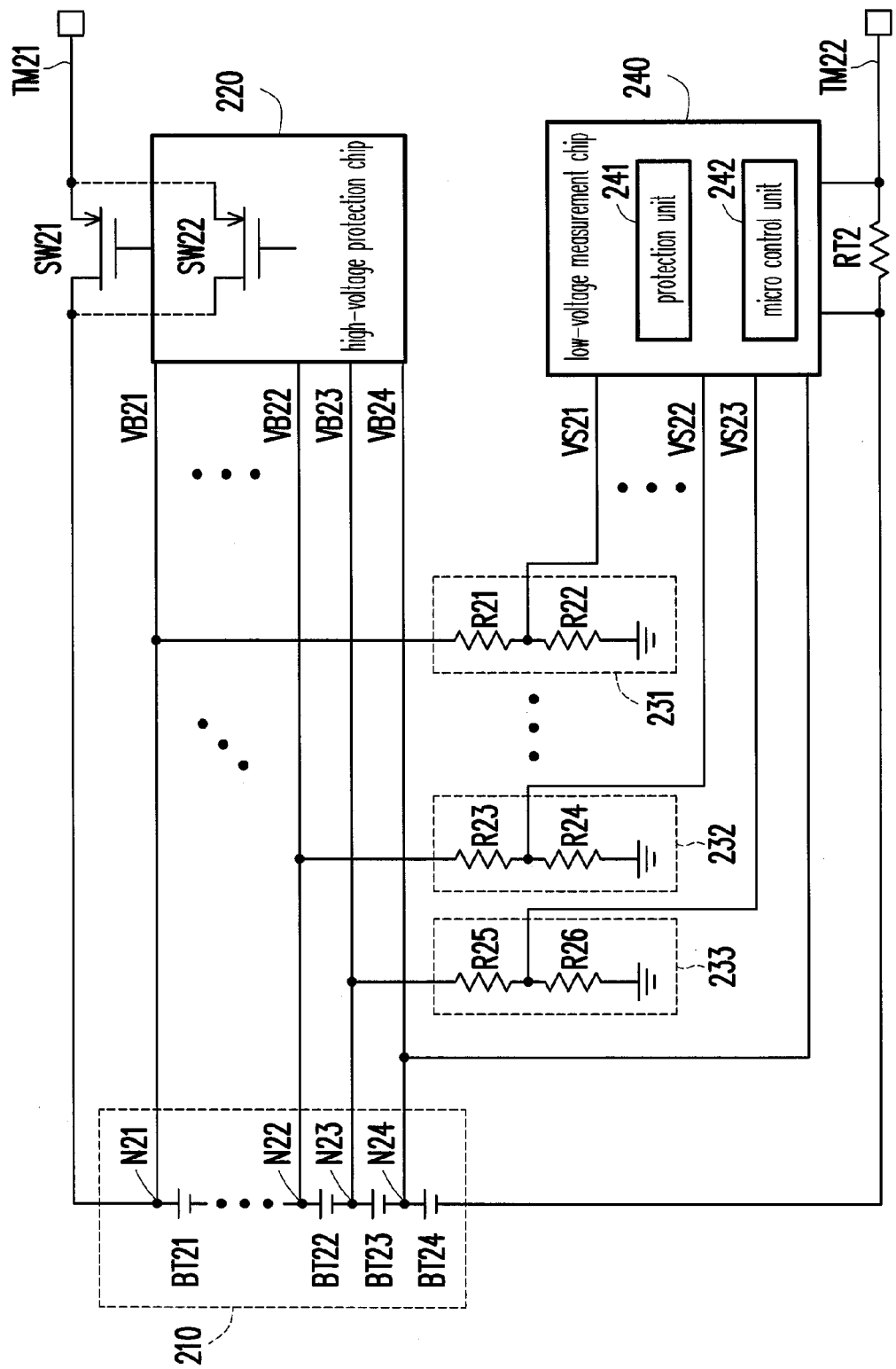
FIG. 2 is a block schematic diagram of a battery power management system according to an embodiment of the invention.

FIG. 2 is a block schematic diagram of a battery power management system according to an embodiment of the invention. Referring to FIG. 2, the battery power management system 200 has a first power terminal TM21 and a second power terminal M22, and includes a protection switch SW21, a battery set 210, a high-voltage protection chip 220, a plurality of voltage-dividing units 231-233 and a low-voltage measurement chip 240. The battery power management system 200 can be connected to an external power adapter through the first power terminal TM21 and the second power terminal TM22 for charging the battery set 210. In an actual application, the battery power management system 200 can be applied in a battery module of a portable computer, or in a battery module of a solar cell.

In view of a whole structure, the protection switch SW21 has a first terminal, a second terminal and a control terminal. The first terminal of the protection switch SW21 is connected to the first power terminal TM21, and the second terminal of the protection switch SW21 is connected to the battery set 210. The battery set 210 includes a plurality of battery cells BT21-BT24, and the battery cells BT21-BT24 are connected in series between the second terminal of the protection switch SW21 and the second power terminal TM22, and have a plurality of sensing nodes N21-N24. In this way, when the protection switch SW21 is turned on, the battery cells BT21-BT24 and an external circuit connected to the system may form a loop, so that the external power voltage can charge the battery cells BT21-BT24.

The high-voltage protection chip 220 is connected to the sensing nodes N21-N24 and the control terminal of the protection switch SW21, and is implemented by using a high-voltage process technology. During operation, the high-voltage protection chip 220 provides a protection mechanism, for example, controls the protection switch SW21 according to a plurality of first sensing voltages VB21-VB24 from the sensing nodes N21-N24. For example, the high-voltage protection chip 220 detects characteristic parameters (for example, voltages, currents and temperatures of the battery cells, etc.) of the battery cells BT21-BT24 according to the first sensing voltages VB21-VB24. Moreover, when the characteristic parameters of the battery cells BT21-BT24 exceed a first normal value, the high-voltage protection chip 220 does not turn on the protection switch SW21, so as to cut off the loop of the battery cells BT21-BT24. In this way, the high-voltage protection chip 220 can provide a primary protection mechanism to the battery set 210 to prevent the battery set 210 from being influenced by an abnormal phenomenon such as over voltage, over current or over temperature, etc.

The voltage-dividing units 231-233 are connected to a part of the sensing nodes, for example, the sensing nodes N21-N23, and divide the first sensing voltages VB21-VB23 to generate a plurality of second sensing voltages VS21-VS23. For example, in the present embodiment, the voltage-dividing unit 231 is formed by a resistor R21 and a resistor R22 connected in series, and is used for dividing the first sensing voltage VB21 to generate the second sensing voltage VS21. Similarly, the voltage-dividing unit 232 is formed by a resistor R23 and a resistor R24 connected in series, and is used for dividing the first sensing voltage VB22 to generate the second sensing voltage VS22. Generation of the second sensing voltage VS23 can be deduced by analogy.

The low-voltage measurement chip 240 is connected to the voltage-dividing units 231-233. In view of a whole structure of the battery power management system 200, the high-voltage protection chip 220 is disposed at the front end of the system. Therefore, a high voltage transmitted by the first power terminal TM21 is first transmitted to the high-voltage protection chip 220. Then, the high voltage transmitted by the first power terminal TM21 drops on the battery set 210 and the voltage-dividing units 231-233 to form a low voltage for transmitting to the low-voltage measurement chip 240. In this way, the low-voltage measurement chip 240 of the present embodiment can be implemented by using a low-voltage process technology.

In operation, the low-voltage measurement chip 240 receives the second sensing voltages VS21-VS23. Then, the low-voltage measurement chip 240 measures electric quantities of the battery cells BT21-BT24 according to the second sensing voltages VS21-VS23, so as to obtain optimal electric quantity estimation values of the battery cells BT21-BT24. Moreover, in an actual application, the low-voltage measurement chip 240 can convert the second sensing voltages VS21-VS23 into corresponding voltage sensing information through a multiplexer and an analog to digital converter (ADC). The multiplexer receives the second sensing voltages VS21-VS23, and outputs the second sensing voltages VS21-VS23 one-by-one to the ADC. In this way, the ADC generates the voltage sensing information corresponding to the second sensing voltages VS21-VS23 one-by-one.

The low-voltage measurement chip 240 can compare the voltage sensing information converted from the second sensing voltages VS21-VS23 with internal predetermined information to determine whether the characteristic parameters of the battery cells BT21-BT24 are normal. The internal predetermined information of the low-voltage measurement chip 240 is, for example, information transmitted by an embedded controller or a host. When the low-voltage measurement chip 240 determines that the characteristic parameters of the battery cells BT21-BT24 are abnormal, it sends a warning signal to a related device, for example, the embedded controller or other protection device, etc., to form a secondary protection mechanism of the battery set 210.

Besides, an internal structure of the low-voltage measurement chip 240 is described below. In the present embodiment, the low-voltage measurement chip 240 includes a protection unit 241 and a micro control unit (MCU) 242. The protection unit 241 detects the characteristic parameters of the battery cells BT21-BT24 according to the second sensing voltages VS21-VS23. Moreover, when a detection result indicates that the characteristic parameters of the battery cells BT21-BT24 exceed a second normal value, the protection unit 241 sends a warning signal to the embedded controller or the host. In other embodiments, the protection unit 241 can also cut off the loop of the battery cells BT21-BT24. In other words, the protection unit 241 forms the secondary protection mechanism of the battery set 210 to further prevent the battery set 210 from being influenced by the abnormal phenomenon. On the other hand, the MCU 242 is used for monitoring the battery power management system 200 to record remained power, remained power supplying time, the first sensing voltages, temperatures and average currents, etc. of the battery cells BT21-BT24.

Although the internal structure of the low-voltage measurement chip 240 is introduced, the invention is not limited thereto. For example, those skilled in the art can remove the MCU 242 in the low-voltage measurement chip 240 according to a design requirement. Now, the battery power management system 200 can be connected to an external controller through a bus, so as to achieve a purpose of monitoring the whole system. For example, when the battery power management system 200 is applied to a computer device, the battery power management system 200 can be connected to an embedded controller of the computer device through a bus, so as to monitor the system through the embedded controller.

The battery power management system 200 further includes a resistor RT2, and the high-voltage protection chip 220 includes a pre-charge switch SW22. The resistor RT2 is connected between the battery set 210 and the second power terminal TM22. Moreover, the low-voltage measurement chip 240 is further connected to both ends of the resistor RT2, and detects a current flowing through the battery cells BT21-BT24 according to the voltages on the two ends of the resistor RT2. Moreover, the detected current can be converted to corresponding current sensing information through the ADC in the low-voltage measurement chip 240. In this way, the low-voltage measurement chip 240 can determine the electric quantities of the battery cells BT21-BT24 according to the current sensing information, the voltage sensing information and other related parameters (for example, the temperature).

Figure 3:
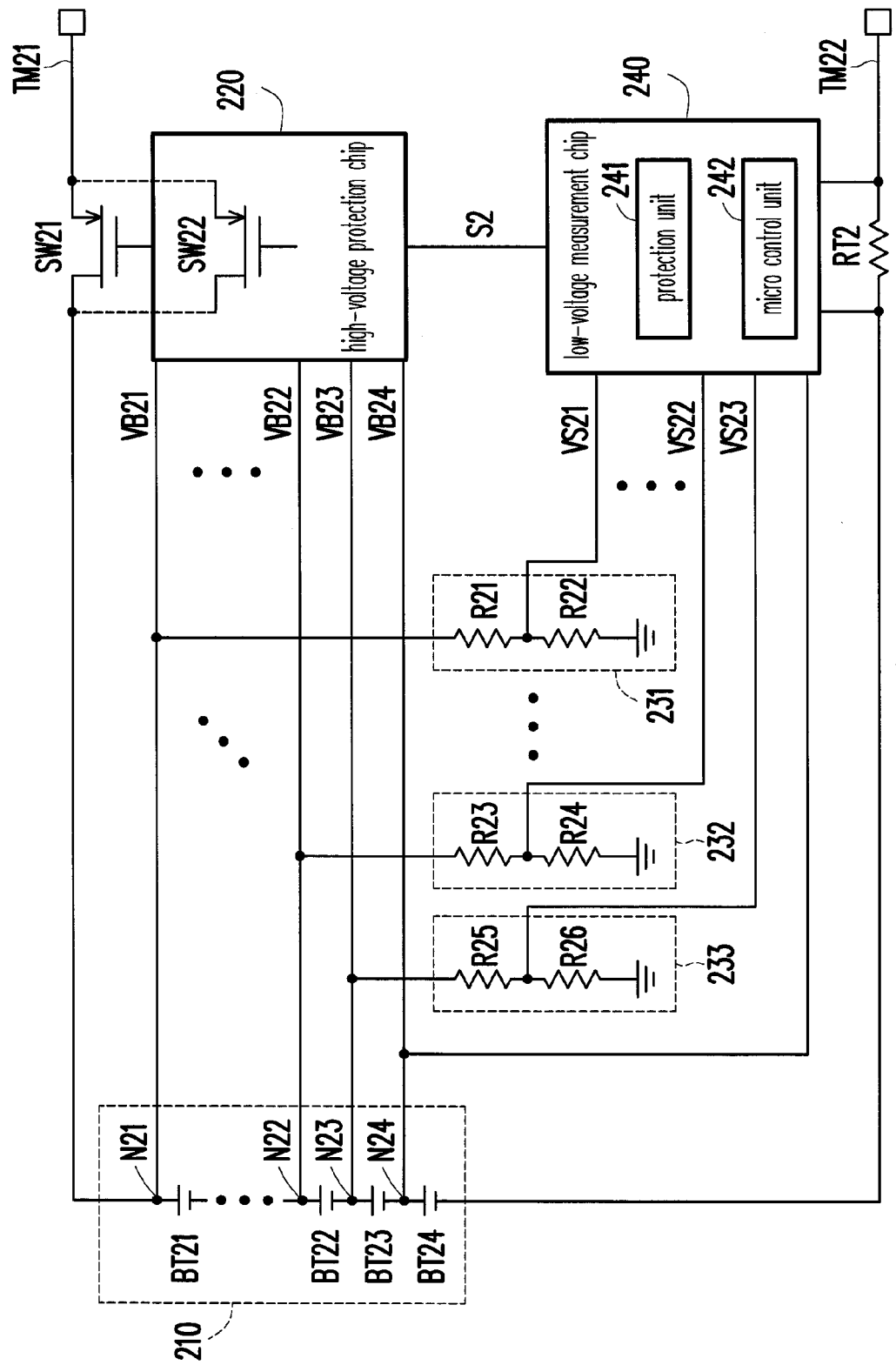
FIG. 3 is a block schematic diagram of a battery power management system according to another embodiment of the invention.

FIG. 3 is a block schematic diagram of a battery power management system according to another embodiment of the invention. Referring to FIG. 2 and FIG. 3, a main difference there between is that in the embodiment of FIG. 2, the battery set 210 does not have a smart charger function. Therefore, the low-voltage measurement chip 240 of FIG. 2 does not transmit related signals to the high-voltage protection chip 220. However, in the embodiment of FIG. 3, the battery set 210 has the smart charger function, so that the low-voltage measurement chip 240 of FIG. 3 can transmit related signals to the high-voltage protection chip 220.

Moreover, in the embodiment of FIG. 3, the low-voltage measurement chip 240 selectively transmits a pre-charge signal S2 to the high-voltage protection chip 220, in order to pre-charge the battery cells BT21-BT24. A main reason of pre-charging the battery cells BT21-BT24 is that in some cases, voltages of battery cells BT21-BT24 can be excessively low due to over discharge of the battery set 210. Now, it is not suitable to charge the battery cells BT21-BT24 by using a large current, in stead, a small current is used to charge the battery cells BT21-BT24 through a pre-charging manner.

Therefore, in an actual application, as shown in FIG. 3, the low-voltage measurement chip 240 determines whether the voltages of the battery cells BT21-BT24 are lower than a minimum voltage value according to the second sensing voltages VS21-VS2. If the second sensing voltages VS21-VS2 are all lower than the minimum voltage value, it represents that the battery set 210 is over discharged. Now, the low-voltage measurement chip 240 sends the pre-charge signal S2 to the high-voltage protection chip 220, and the high-voltage protection chip 220 enables the pre-charge function of the battery set 210. Comparatively, when the low-voltage measurement chip 240 determines that the current flowing through the battery cells BT21-BT24 is higher than a predetermined current value according to the current sensing information, the low-voltage measurement chip 240 stops sending the pre-charge signal S2, so as to disable the pre-charge function of the battery set 210. Now, the battery set 210 is changed from a pre-charging mode to an original large current charging mode.

The low-voltage measurement chip 240 enables the pre-charge function of the battery set 210 through the pre-charge switch SW22. The pre-charge switch SW22 has a first terminal, a second terminal and a control terminal. The first terminal and the second terminal of the pre-charge switch SW22 are connected in parallel to the first terminal and the second terminal of the protection switch SW21. When the low-voltage measurement chip 240 determines that the pre-charge operation is required, it produces the pre-charge signal S2, i.e. switches the pre-charge signal S2 from a low level to a high level. Then, the high-voltage protection chip 220 turns on the pre-charge switch SW22 according to the pre-charge signal S2, and turns off the protection switch SW21. Now, the current flowing towards the battery cells BT21-BT24 from the first power terminal TM21 is a small current, so as to achieve an effect of pre-charging. Comparatively, when the low-voltage measurement chip 240 stops producing the pre-charge signal S2, i.e. switches the pre-charge signal S2 from the high level to the low level, the high-voltage protection chip 220 turns on the protection switch SW21, and turns off the pre-charge switch SW22. Now, the battery set 210 is restored to the large current charging mode.

Moreover, the high-voltage protection chip 220 can also control the pre-charge switch SW22 according to the first sensing voltages VB21-VB23. For example, the high-voltage protection chip 220 determines whether the battery cells BT21-BT24 are required to be pre-charged according to the first sensing voltages VB21-VB23. When the determination result is affirmative, the high-voltage protection chip 220 turns on the pre-charge switch SW22, and turns off the protection switch SW21. Comparatively, when the determination result is negative, the high-voltage protection chip 220 turns on the protection switch SW21, and turns off the pre-charge switch SW22.

Figure 4:
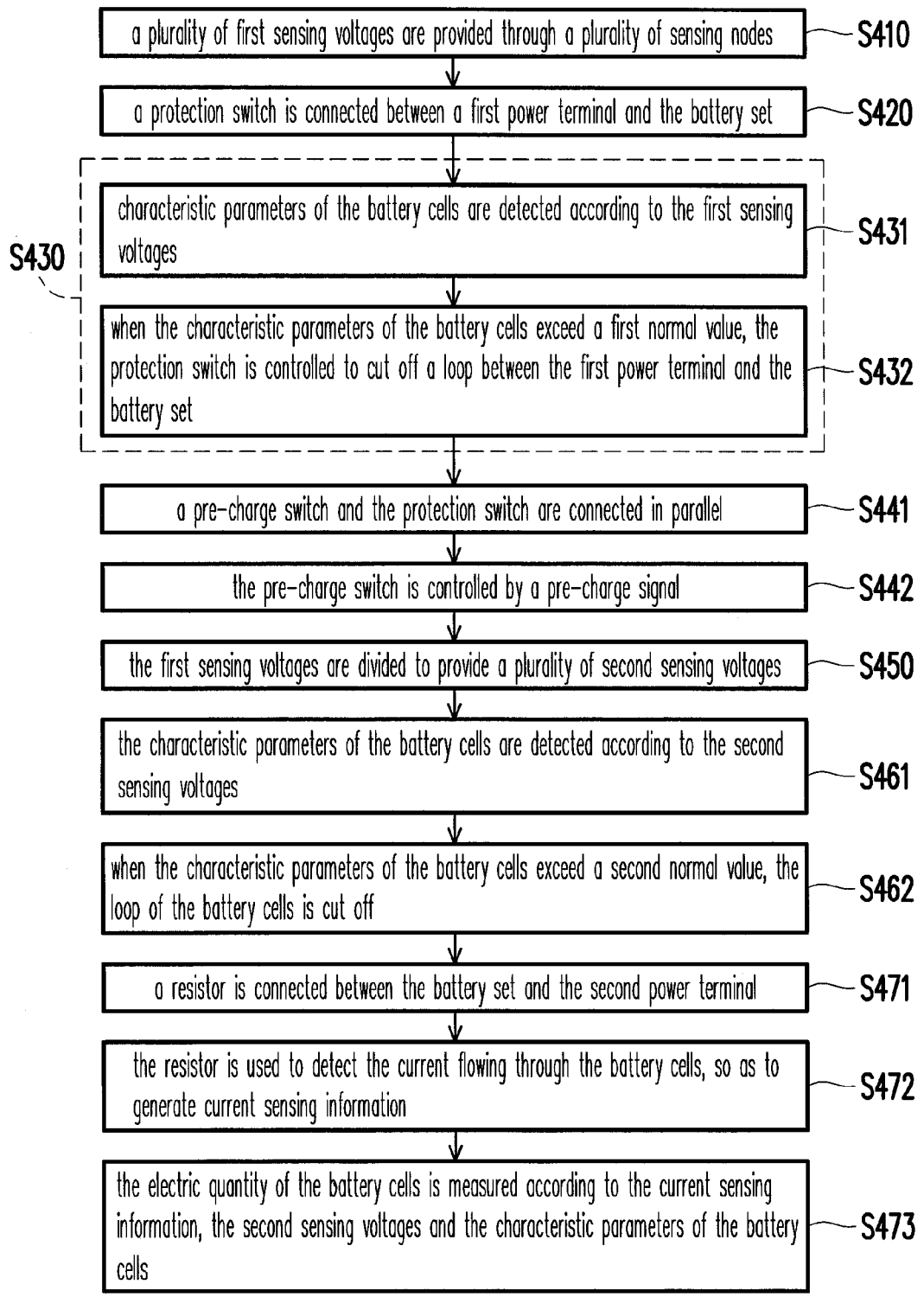
FIG. 4 is a flowchart illustrating a battery power management method according to an embodiment of the invention.

FIG. 4 is a flowchart illustrating a battery power management method according to an embodiment of the invention. The battery power management method is adapted to a battery set. Moreover, the battery set includes a plurality of battery cells and has a plurality of sensing nodes, and a part of the sensing nodes are respectively located between the battery cells.

Referring to FIG. 4, in step S410 and S420, a plurality of first sensing voltages is provided through the sensing nodes, and a protection switch is connected between a first power terminal and the battery set. Moreover, in step S430, the protection switch is controlled according to the first sensing voltages. Regarding controlling of the protection switch, in step S431 and step S432, characteristic parameters of the battery cells are detected according to the first sensing voltages. Moreover, when the characteristic parameters of the battery cells exceed a first normal value, the protection switch is controlled to cut off a loop between the first power terminal and the battery set. In this way, a primary protection mechanism of the battery set is formed.

Moreover, regarding the battery set having the smart charger function, the pre-charge function can be achieved through steps S441 and S442. Comparatively, if the battery set does not have the smart charger function, the steps S441 and S442 can be removed. Regarding the pre-charge control, in the steps S441 and S442, a pre-charge switch and the protection switch are connected in parallel, and the pre-charge switch is controlled by a pre-charge signal. In this way, when the pre-charge switch is turned on, a current flowing towards the battery cells from the first power terminal is a small current, so as to achieve the effect of pre-charging.

On the other hand, in step S450, the first sensing voltages are divided to provide a plurality of second sensing voltages. In an actual application, if secondary protection of the battery set is required, in steps S461 and S462, the second sensing voltages can be used to serve as determination criterions for the second protection mechanism. Comparatively, those skilled in the art can remove the steps S461 and S462 according to a design requirement. Regarding an implementation of the secondary protection, in the steps 461 and 462, the characteristic parameters of the battery cells are detected according to the second sensing voltages. Moreover, when the characteristic parameters of the battery cells exceed a second normal value, the loop of the battery cells is cut off In this way, the secondary protection mechanism of the battery set is formed.

Moreover, in step S473, the second sensing voltages can further serve as detection criterions of an electric quantity of the battery set. Moreover, in order to improve detection accuracy, in steps S471 and S472, a resistor is connected between the battery set and the second power terminal, and the connected resistor is used to detect the current flowing through the battery cells, so as to generate current sensing information. In this way, in step S473, the electric quantities of the battery cells are measured according to the current sensing information, the second sensing voltages and the characteristic parameters of the battery cells.

In summary, in the invention, the high-voltage protection chip is disposed at the front end of the system, and the high-voltage protection chip is used to control the protection switch. In this way, when the system has an abnormal phenomenon (for example, over voltage or over current, etc.) and the high-voltage protection chip is damaged, the battery power management system can still measure and protect the battery set through the low-voltage measurement chip, so that reliability and service life of the system are improved. Besides, since the first sensing voltages are voltage-divided by the voltage-dividing units and then transmitted to the low-voltage measurement chip, the low-voltage measurement chip can be implemented by using a low-voltage process technology, which avails reducing a layout area and production cost of the battery power management system. Moreover, the low-voltage measurement chip is not liable to be influenced by the abnormal phenomenon (for example, over voltage). In addition, the high-voltage protection chip and the low-voltage measurement chip are all respectively configured as a multi-input structure to obtain voltages related to the battery cells, so as to accurately determine the electric quantity of the battery set and protect the battery set.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A battery power management system, having a first power terminal and the battery power management system comprising:
   a battery set, comprising a plurality of battery cells and having a plurality of sensing nodes, wherein a part of the sensing nodes are respectively located between the battery cells, and the sensing nodes provide a plurality of first sensing voltages;
   a protection switch, connected between the first power terminal and the battery set;
   a high-voltage protection chip, connected to the sensing nodes and the protection switch, and controlling the protection switch according to the first sensing voltages, wherein the high-voltage protection chip comprises:
      a pre-charge switch, connected in parallel to the protection switch, and the high-voltage protection chip controls the pre-charge switch according to a pre-charge signal;
   a plurality of voltage-dividing units, respectively connected to the sensing nodes, and dividing the first sensing voltages to generate a plurality of second sensing voltages; and
   a low-voltage measurement chip, connected to the voltage-dividing units, and measuring an electric quantity of the battery set according to the second sensing voltages, wherein the low-voltage measurement chip is connected to the high-voltage protection chip, and the low-voltage measurement chip provides the pre-charge signal to the high-voltage protection chip.

2. The battery power management system as claimed in claim 1, wherein the high-voltage protection chip detects characteristic parameters of the battery cells according to the first sensing voltages, and when the characteristic parameters of the battery cells exceed a first normal value, the high-voltage protection chip controls the protection switch to cut off a loop of the first power terminal and the battery set.

3. The battery power management system as claimed in claim 1, wherein the low-voltage measurement chip comprises:
   a protection unit, detecting characteristic parameters of the battery cells according to the second sensing voltages, wherein when the characteristic parameters of the battery cells exceed a second normal value, the protection unit cut off a loop of the battery cells; and
   a micro control unit, monitoring the battery power management system.

4. The battery power management system as claimed in claim 1, further comprising:
   a resistor, connected between the battery set and the second power terminal, wherein the low-voltage measurement chip is further connected to both ends of the resistor to detect a current flowing through the battery cells, so as to generate current sensing information, and the low-voltage measurement chip measures the electric quantities of the battery cells according to the current sensing information, the second sensing voltages and the characteristic parameters of the battery cells.

5. A battery power management method, adapted to a battery set, wherein the battery set comprises a plurality of battery cells and has a plurality of sensing nodes, and a part of the sensing nodes are respectively located between the battery cells, the battery power management method comprising:
   providing a plurality of first sensing voltages through the sensing nodes;
   connecting a protection switch between a first power terminal and the battery set;
   controlling the protection switch according to the first sensing voltages;
   dividing the first sensing voltages to provide a plurality of second sensing voltages;
   measuring an electric quantity of the battery set according to the second sensing voltages;
   connecting a pre-charge switch and the protection switch in parallel; and
   controlling the pre-charge switch according to a pre-charge signal.

6. The battery power management method as claimed in claim 5, wherein the step of controlling the protection switch according to the first sensing voltages comprises:
   detecting characteristic parameters of the battery cells according to the first sensing voltages; and
   controlling the protection switch to cut off a loop of the first power terminal and the battery set when the characteristic parameters of the battery cells exceed a first normal value.

7. The battery power management method as claimed in claim 5, further comprising:
   detecting characteristic parameters of the battery cells according to the second sensing voltages; and
   cutting off a loop of the battery cells when the characteristic parameters of the battery cells exceed a second normal value.

8. The battery power management method as claimed in claim 5, further comprising:
   connecting a resistor between the battery set and a second power terminal;
   detecting a current flowing through the battery cells through the resistor, so as to generate current sensing information; and
   measuring the electric quantities of the battery cells according to the current sensing information, the second sensing voltages and the characteristic parameters of the battery cells.

* * * * *